United States Patent
Zhang et al.

(10) Patent No.: US 12,429,466 B2
(45) Date of Patent: Sep. 30, 2025

(54) PERFORMANCE EVALUATION METHOD FOR NATURAL GAS ANALYSIS SYSTEM

(71) Applicant: CNOOC Gas & Power Group, Beijing (CN)

(72) Inventors: Chao Zhang, Beijing (CN); Bing Liu, Beijing (CN); Nan Xing, Beijing (CN); Jing Tian, Beijing (CN); Li Xiao, Beijing (CN); Jianhong Wu, Beijing (CN); Liang Tian, Beijing (CN); Yonghao Liu, Beijing (CN); Dongyu An, Beijing (CN); Tao Song, Beijing (CN); Yujie Ren, Beijing (CN); Yu Cao, Beijing (CN); Xin Li, Beijing (CN)

(73) Assignee: CNOOC GAS & POWER GROUP, Beijing (CN)

( * ) Notice: Subject to any disclaimer, the term of this patent is extended or adjusted under 35 U.S.C. 154(b) by 339 days.

(21) Appl. No.: 18/065,336

(22) Filed: Dec. 13, 2022

(65) Prior Publication Data

US 2023/0408467 A1     Dec. 21, 2023

(30) Foreign Application Priority Data

Jun. 17, 2022   (CN) .......................... 202210687878.1

(51) Int. Cl.
    *G01N 30/86*     (2006.01)
    *G01N 30/02*     (2006.01)
    *G01N 30/88*     (2006.01)

(52) U.S. Cl.
    CPC ......... *G01N 30/8675* (2013.01); *G01N 30/02* (2013.01); *G01N 30/8631* (2013.01); *G01N 30/8651* (2013.01); *G01N 30/8665* (2013.01); *G01N 30/8693* (2013.01); *G01N 30/88* (2013.01)

(58) Field of Classification Search
    CPC ........... G01N 30/8675; G01N 30/8631; G01N 30/8665; G01N 30/8693; G01N 30/88; G01N 30/02; G01N 30/8651; G06F 17/18
    See application file for complete search history.

(56) References Cited

U.S. PATENT DOCUMENTS

2023/0281524 A1 *   9/2023   Bondalapati .............. F02C 9/00
                                                                                                                701/100

FOREIGN PATENT DOCUMENTS

CN            114441710 A   *   5/2022

OTHER PUBLICATIONS

First Office Action issued in corresponding Chinese Application No. 202210687878.1; mailed Jul. 26, 2023; 25 pgs.

Yong, Chen et al; Natural Gas-Performance Evaluation of Analytical System; issued date Sep. 17, 2018; National Standard of the People's Republic of China GB/T 28766-2018; 29 pgs. (Abstract).

\* cited by examiner

*Primary Examiner* — Helen C Kwok
(74) *Attorney, Agent, or Firm* — HAUPTMAN HAM, LLP

(57) ABSTRACT

A method for evaluating performance of a natural gas analysis system includes obtaining components of a natural gas analysis system as well as the maximum allowable error and the maximum allowable deviation of a calorific value of each of the components. The method includes determining components and uncertainties of a standard gas mixture; obtaining a final peak area of each of the components in each group of standard gas mixture. The method includes obtaining calibration functions of the natural gas analysis system and analytical functions of respective components. The method includes obtaining an uncertainty and a calorific value uncertainty of each of the components. The method includes judging whether the evaluation result from the natural gas analysis system to be evaluated is qualified, and providing a performance evaluation conclusion for the natural gas analysis system.

8 Claims, No Drawings

PERFORMANCE EVALUATION METHOD FOR NATURAL GAS ANALYSIS SYSTEM

RELATED APPLICATIONS

The present application claims priority from Chinese Application Number 202210687878.1, filed Jun. 17, 2022, the disclosure of which is hereby incorporated by reference herein in its entirety.

FIELD OF THE INVENTION

The present disclosure relates to the technical field of natural gas transportation and distribution, in particular to a method for evaluating performance of a natural gas analysis system.

BACKGROUND OF THE INVENTION

At present, laws and regulations have been promulgated at the national level to promote implementation of natural gas energy metering. For example, domestic natural gas analysis systems adopt "Analysis of natural gas composition—Gas chromatography" (GB/T 13610) for linear, repeatable and reproducible detection. However, natural gas metering is still in a critical period of transition from volume metering to energy metering. The original natural gas metering in China is volume metering which, after decades of development, has been mature in technology and comprehensive in its relevant measurement laws and regulations, standards, and specifications. In the process of transitioning from volume metering to energy metering, the most important change lies in measurement on calorific values of natural gas, in which a natural gas analysis system, i.e., a natural gas chromatograph, is required to be applied. The existing "Analysis of natural gas composition—Gas chromatography" (GB/T 13610) is incapable of implementing performance evaluation on the natural gas analysis system with full range, especially in the field of fair and open trade measurement as it is impossible to determine the accuracy of performance indicators of the natural gas analysis system.

A reason investigated in this regard lies in absence of methods capable of evaluating performance of natural gas analysis systems in domestic at present, which amounts to losing the fairness and impartiality of energy metering.

SUMMARY OF THE INVENTION

An objective of the present disclosure is to provide a method for evaluating performance of a natural gas analysis system in order to solve the problem of absence of methods capable of evaluating performance of natural gas analysis systems in domestic at present.

The present disclosure provides a method for evaluating performance of a natural gas analysis system, comprising:
  obtaining components of the natural gas analysis system as well as a maximum allowable error and a maximum allowable deviation of a calorific value of each of the components;
  determining, according to the components of the natural gas analysis system, components and uncertainties of a standard gas mixture by using the principle of uniform distribution;
  performing, by the natural gas analysis system to be evaluated, 10 times component analysis in turn on the components of each group of standard gas mixture, and recording original data regarding peak areas; performing drift correction on the original data regarding peak areas to obtain drift-corrected peak areas; performing gross error elimination on the drift-corrected peak areas and obtaining final peak areas of respective components of each group of standard gas mixture;
  performing regression analysis between the components of the standard gas mixture and the final peak areas subjected to the drift correction by using a generalized least squares method to obtain calibration functions of the natural gas analysis system and analytical functions of the respective components;
  calculating, by using the calibration function of the natural gas analysis system, a peak area related to each of components in 10,000 groups of natural gas mixtures, then calculating, by using the analytical function, a component related to each peak area, and calculating and obtaining an uncertainty and a calorific value uncertainty of each of the components; and
  judging whether an evaluation result from the natural gas analysis system to be evaluated is qualified, and providing a performance evaluation conclusion for the natural gas analysis system.

Specifically, determining components and uncertainties of a standard gas mixture includes steps of:
  determining categories of the standard gas mixture according to categories of elementary substances of the natural gas analysis system, wherein the categories of elementary substances of the standard gas mixture should be the same as the categories of elementary substances of the natural gas analysis system;
  determining a quantity of groups of standard gas mixtures that are required according to an order of an analytical function regarding category of each elementary substance;
  determining a quantity of groups of standard gas mixtures according to an order of an analytical function obtained from the last performance evaluation on the natural gas analysis system; and
  determining uncertainties of the standard gas mixture according to the uncertainties of the natural gas analysis system.

Specifically, obtaining final peak areas of respective components of each group of standard gas mixture includes steps of:
  performing, by the natural gas analysis system to be evaluated, 10 times component analysis in turn on the components of each group of standard gas mixture, and recording atmospheric pressures and original data regarding peak areas;
  subjecting the original data regarding peak areas to drift correction to obtain drift-corrected peak areas; and
  subjecting the drift-corrected peak areas to gross error elimination to obtain final peak areas of the respective components of each group of standard gas mixture.

Specifically, to obtain calibration functions of the natural gas analysis system and analytical functions of the respective components includes steps of:
  calculating an average peak area and a standard deviation of each component according to an uncertainty and a final peak area of each component in the standard gas mixture;
  calculating, respectively with respect to first-order, second-order, and third-order polynomials, a regression coefficient and goodness-of-fit of a calibration function of each component by using the generalized least squares regression process according to data regarding peak area and component of each component in the standard gas mixture; and determining a final calibration function of each component according to the first-order, second-order, and third-order calibration functions of each component, wherein one with goodness-of-fit close to 1 is taken as the optimum, but in a case that there are the same goodness-of-fits, the one with the lower order is better;

calculating, respectively with respect to first-order, second-order and third-order polynomials, a regression coefficient and goodness-of-fit of an analytical function of each component by using the generalized least squares regression process according to data regarding content and peak area of each component; and determining a final analytical function of each component according to the first-order, second-order, and third-order analytical functions of each component, wherein one with goodness-of-fit close to 1 is taken as the optimum, but in the case that there are the same goodness-of-fits, the one with the lower order is better.

Specifically, calculating and obtaining an uncertainty and a calorific value uncertainty of each of the components includes steps of:

a method for constructing a Monte Carlo model to simulate 10,000 groups of natural gas mixtures, in which the components of each group of natural gas mixture should be within an analysis range of the natural gas analysis system to be evaluated, composition of the 10,000 groups of natural gas mixtures are calculated and obtained by using a subtraction method on the basis of identical intervals and by using methane as balance gas, and unnatural natural gas components should be avoided;

calculating high-level calorific values of the 10,000 groups of simulated natural gas mixtures, respectively, according to the components of the 10,000 groups of simulated natural gas mixtures;

calculating a peak area related to each component of each group of simulated natural gas mixture by using the calibration function;

calculating a measured component related to the resulted peak area of each component of each group of simulated natural gas mixture by using the analytical function;

calculating an analytical uncertainty of each component of each group of simulated natural gas mixture;

calculating an average measurement error and an uncertainty of each component in the simulated natural gas mixture;

calculating high-level calorific values of each group of measured components and uncertainties of each group of measured components according to measured mole fractions; and calculating an average measurement error of the high-level calorific values of the simulated natural gas mixtures and a standard uncertainty of the high-level calorific values of the simulated natural gas mixtures.

The present disclosure further relates to a device for evaluating performance of a natural gas analysis system, comprising:

a first processing unit configured to obtain components of the natural gas analysis system as well as a maximum allowable error and a maximum allowable deviation of a calorific value of each of the components;

a second processing unit configured to determine components and uncertainties of a standard gas mixture according to the components of the natural gas analysis system by using the principle of uniform distribution;

a third processing unit configured to perform, by the natural gas analysis system to be evaluated, 10 times component analysis in turn on the components of each group of standard gas mixture, and record original data regarding peak areas; perform drift correction on the original data regarding peak areas to obtain drift-corrected peak areas; perform gross error elimination on the drift-corrected peak areas to obtain final peak areas of respective components of each group of standard gas mixture;

a fourth processing unit configured to perform regression analysis between the components of the standard gas mixture and the final peak areas subjected to the drift correction by using the generalized least squares method to obtain calibration functions of the natural gas analysis system and analytical functions of the respective components;

a fifth processing unit configured to calculate, by using the calibration function of the natural gas analysis system, a peak area related to each of components in 10,000 groups of natural gas mixtures, then calculate, by using the analytical function, a component related to each peak area, and calculate and obtain an uncertainty and a calorific value uncertainty of each of the components; and a sixth processing unit configured to judge whether the evaluation result from the natural gas analysis system to be evaluated is qualified, and provide a performance evaluation conclusion for the natural gas analysis system.

The present disclosure further relates to a computer-readable storage medium on which a computer program is stored, wherein the computer program, when being executed by a processor, implements the steps of the method described above.

The present disclosure further relates to a computer device comprising a memory, a processor and a computer program stored on the memory and executable by the processor, wherein the processor, when running the computer program thereon, executes the steps of the method described above.

Compared with the existing technology, beneficial effects of the present disclosure are that, The present disclosure discloses a method for evaluating performance of a natural gas analysis system, which realizes performance evaluation on the natural gas analysis system with full range based on powerful computing capability of a computer, thereby providing technical support and assistance means to promote implementation of natural gas energy reform policies, and making preparation for pipeline network metering upgrade. The present disclosure discloses a method for evaluating performance of a natural gas analysis system, which makes up for the absence of performance evaluation methods for natural gas analysis systems in domestic, determines errors and uncertainties of the natural gas analysis systems, and thus facilitates application and implementation of national natural gas energy metering.

DETAILED DESCRIPTION OF THE EMBODIMENTS

The following embodiments are used for the illustrative purpose of the present disclosure, but not intent to limit the scope of the present disclosure.

The present disclosure provides a method for evaluating performance of a natural gas analysis system in order to address the problem of absence of methods capable of evaluating performance of natural gas analysis systems in domestic at present. It is to, first, obtain components of a natural gas analysis system as well as a maximum allowable error and a maximum allowable deviation of a calorific value of each of the components; then, determine components and uncertainties of a standard gas mixture according to the components of the natural gas analysis system and using the principle of uniform distribution; obtain an final peak area of each of the components in each group of standard gas mixture; next, perform regression analysis between the components of the standard gas mixture and the final peak areas subjected to the drift correction by using the generalized least squares method to obtain calibration functions of the natural gas analysis system and analytical functions of respective components; then, calculate, by using the calibration function of the natural gas analysis system, a peak area related to each of the components in 10,000 groups of natural gas mixtures, then calculate, by using the analytical function, a component related to each peak area, and calculate and obtain an uncertainty and a calorific value uncertainty of each of the components; finally, judge whether an evaluation result from the natural gas analysis system to be evaluated is qualified, and provide an conclusion that evaluates performance of the natural gas analysis system. The method for evaluating performance of a natural gas analysis system provided by the present disclosure makes up for the absence of methods for performance evaluation on natural gas analysis systems in domestic, determines errors and uncertainties of the natural gas analysis systems, and thus facilitates application and implementation of natural gas energy metering at the national level.

Embodiment 1

Embodiment 1 provides a method for evaluating performance of a natural gas analysis system, which is configured to evaluate the natural gas analysis system, and the method comprises the following steps S1 to S6.

Step S1, obtaining components of a natural gas analysis system as well as a maximum allowable error and a maximum allowable deviation of a calorific value of each of the components.

Natural gas is a mixture composed of a variety of elementary substances (such as methane, ethane, etc.), and a content of mass percent of each elementary substance is referred to as a component of this composition. The term "component" here refers to a category and a content of a certain elementary substance in the natural gas analysis system, and term "calorific value" refers to an amount of heat that can be obtained from full combustion of natural gas under a standard condition, and wording "a calorific value of each of the components" refers to a calorific value of a component.

Step S2, determining components and uncertainties of a standard gas mixture according to the components of the natural gas analysis system and using the principle of uniform distribution.

In this case, components of the standard gas mixture include categories of elementary gas and contents of each type of elementary gas. The categories of the natural gas are determined in accordance of the categories of the elementary substances in the natural gas analysis system. The components of the standard gas mixture are calculated and obtained according to the components of the natural gas analysis system and using the principle of uniform distribution.

The step S2 specifically includes the following steps S21 to S24.

Step S21, categories of a standard gas mixture are determined according to the categories of the elementary substances of the natural gas analysis system, and the categories of elementary substances of the standard gas mixture should be the same as the categories of the elementary substances of the natural gas analysis system.

Step S22, the number of groups of standard gas mixtures that are required are determined according to the order of an analytical function regarding the category of each elementary substance.

For example, 3 groups of standard gas mixtures are required if the analytical function regarding the category of each elementary substance is a first-order one, 5 groups of standard gas mixtures are required if the analytical function regarding the category of each elementary substance is a second-order one, and 7 groups of standard gas mixtures are required if the analytical function regarding the category of each elementary substance is a third-order one.

Step S23, the number of groups of standard gas mixtures are determined according to the order of an analytical function obtained from the last performance evaluation on the natural gas analysis system.

For example, if the natural gas analysis system was subjected to performance evaluation for the first time, then 7 groups of standard gas mixtures should be selected.

Step S24, uncertainties of the standard gas mixture are determined according to uncertainties of the natural gas analysis system.

In this case, the uncertainties of the standard gas mixture should be less than the uncertainties of the natural gas analysis system; the content of each elementary substance in the standard gas mixture should be evenly distributed within an analysis range of the natural gas analysis system and with a minimum mole fraction no less than 0.01%. As a result, the components of the standard gas and an uncertainty of each of the components are determined finally.

Step S3, performing, by the natural gas analysis system to be evaluated, 10 times component analysis in turn on the components of each group of standard gas mixture, and recording original data regarding peak areas; performing drift correction on the original data regarding peak areas to obtain drift-corrected peak areas; performing gross error elimination on the drift-corrected peak areas to obtain final peak areas of respective components of each group of standard gas mixture.

In this case, the term "component analysis" refers to analysis results obtained by analyzing respective components in the natural gas mixture using the natural gas analysis system, and an analysis result is a peak area of a component.

The wording "10 times component analysis" refers to performing the component analysis for 10 times on the components of each group of standard gas mixture by using the natural gas analysis system to be evaluated so that 10 groups of analysis results are obtained.

Specifically, the step S3 includes the following steps S31 to S33.

Step S31, component analysis are performed 10 times in turn on the components of each group of standard gas mixture by the natural gas analysis system to be evaluated, and atmospheric pressures and original data regarding peak areas are recorded.

Step S32, the original data regarding peak areas are subjected to drift correction to obtain drift-corrected peak areas, where a drift correction expression is, $$y_{i,j,k} = y'_{i,j,k} \frac{101.325}{P_a} \quad \text{(Formula 1)}$$

where $y_{i,j,k}$ is a peak area resulted by subjecting the jth content of the ith elementary substance in the standard gas mixture to drift correction during the kth analysis;

$y'_{i,j,k}$ is a peak area of the jth content of the ith elementary substance in the standard gas mixture during the kth analysis;

Pa is a laboratory atmospheric pressure during the kth analysis for the jth content of the ith elementary substance in the standard gas mixture;

i is a positive integer, and i is less than or equal to the number of species of the elementary substance in the standard gas mixture;

j is a positive integer, and j is less than or equal to the number of groups of standard gas mixtures; and k is a positive integer, and k is less than or equal to the number of times of component analysis.

Step S33, the drift-corrected peak areas are subjected to gross error elimination by using a Grubbs test method to obtain final peak areas of the respective components of each group of standard gas mixture.

Step S4, performing, using the generalized least squares method, regression analysis between the components of the standard gas mixture and the drift-corrected peak areas to obtain calibration functions of the natural gas analysis system and analytical functions for respective components.

In this case, the step S4 specifically includes the following steps S41 to S45.

Step S41, an average peak area and a standard deviation of each component are calculated according to an uncertainty and a final peak area of each component in the standard gas mixture;

Step S42, a regression coefficient and goodness-of-fit of a calibration function of each component are calculated with respect to, respectively, first-order, second-order, and third-order polynomials by using the generalized least squares regression process according to the data regarding peak area and component of each component in the standard gas mixture, wherein an expression for the goodness-of-fit is, $$\begin{cases} \Gamma_{ri} = (\Gamma_{rij})_{max} \\ \Gamma_{rij} = |\hat{y}_{ij} - y_{ij}|/u(y_{ij}) \end{cases} \quad \text{(Formula 2)}$$

where $\Gamma_{ri}$ is goodness-of-fit of an calibration function of the ith elementary substance;

$\Gamma_{rij}$ is goodness-of-fit of a calibration function of the jth content of the ith elementary sub stance;

$y_{ij}$ is an average peak area of the jth content of the ith elementary substance;

$u(y_{ij})$ is a standard uncertainty of the average peak area $y_{ij}$ of the jth content of the ith elementary substance; and $\hat{y}_{ij}$ is a corrected peak area calculated and resulted by substituting the jth content of the ith elementary substance into the calibration function.

Step S43, a final calibration function of each component is determined according to the first-order, second-order, and third-order calibration functions of each component, wherein one with goodness-of-fit close to 1 is taken as the optimum, but in the case that there are the same goodness-of-fits, the one with the lower order is better;

Step S44, a regression coefficient and goodness-of-fit of an analytical function of each component are calculated with respect to, respectively, first-order, second-order and third-order polynomials by using the generalized least squares regression process according to the data regarding content and peak area of each component; and Step S45, a final analytical function of each component is determined according to the first-order, second-order, and third-order analytical functions of each component, wherein one with goodness-of-fit close to 1 is taken as the optimum, but in the case that there are the same goodness-of-fits, the one with the lower order is better.

Step S5, building a Monte Carlo model to simulate 10,000 groups of natural gas mixtures, calculating a peak area related to each component in the 10,000 groups of natural gas mixtures by using the calibration function of the natural gas analysis system, then calculating a component related to each peak area by using the analytical function, and calculating and obtaining an uncertainty and a calorific value uncertainty of each component.

In this case, the step S5 includes the following steps S51 to S58.

Step S51, in a method for constructing a Monte Carlo model to simulate 10,000 groups of natural gas mixtures, the components of each group of natural gas mixture should be within the analysis range of the natural gas analysis system to be evaluated, composition of the 10,000 groups of natural gas mixtures are calculated and obtained by using a subtraction method on the basis of identical intervals and by using methane as balance gas, and unnatural natural gas components should be avoided.

Step S52, high-level calorific values $H_{s,tn}$ of the 10,000 groups of simulated natural gas mixtures are calculated, respectively, according to the components of the 10,000 groups of simulated natural gas mixtures, and an expression thereof is, $$H_{s,tn} = \sum_{n=1}^{10000} x_{tin} \cdot [H_c]_i \quad \text{(Formula 3)}$$

where $H_{s,tn}$ is a high-level calorific value of the nth group of simulated natural gas mixture;

$x_{tin}$ is a component of the ith elementary substance in the nth simulated natural gas mixture;

$[H_c]_i$ is an ideal gas molar calorific value of the ith elementary substance; and n is a positive integer, and its maximum value is the number of times for simulating the natural gas mixtures.

Step S53, a peak area related to each component of each group of simulated natural gas mixture is calculated by using the calibration function.

Step S54, a measured component related to the resulted peak area of each component of each group of simulated natural gas mixture is calculated by using the analytical function.

Step S55, an analytical uncertainty [u($x_{in}$)] of each component of each group of simulated natural gas mixture is calculated, and an expression thereof is, $$u(x_{in}) = \sqrt{[U(x_{a,i})]^2 + [U(x_{b,i})]^2 + [U(x_{c,in})]^2} \quad \text{(Formula 4)}$$

where [u($x_{in}$)] is an analytical uncertainty of a component of the ith elementary substance in the nth simulated natural gas mixture;
U($x_{a,i}$) is an average of standard uncertainties of the ith elementary substance in the standard gas mixture;
U($x_{b,i}$) is an average of standard uncertainties of peak area of the ith elementary substance in the standard gas mixture; and
U($x_{a,in}$) is a regression standard deviation of an analytical function confirmed to be related to the ith elementary substance in the nth group of simulated natural gas mixture.

Step S56, an average measurement error [δ($x_i$)] and an uncertainty [u($x_i$)] of each component in the simulated natural gas mixture are calculated, wherein expressions of the average measurement error and the uncertainty are, respectively, $$\begin{cases} \delta(x_{in}) = x_{min} - x_{tin} \\ \delta(x_i) = \sum_{n=1}^{10000} \delta(x_{in})/10000 \\ u(x_i) = \sqrt{\left\{\sum_{n=1}^{10000} [u(x_{in})]^2 + \sum_{n=1}^{10000} [\delta(x_{in}) - \delta(x_i)]^2\right\}/10000} \end{cases} \quad \text{(Formula 5)}$$

where $x_{tin}$ is a component of the ith elementary substance in the nth simulated natural gas mixture;
$x_{min}$ is a measured component of the ith elementary substance in the nth simulated natural gas mixture calculated and obtained through the analytical function;
δ($x_{in}$) is a measurement error of the component of the ith elementary substance in the nth simulated natural gas mixture;
δ($x_i$) is an average measurement error of the component of the ith elementary substance in the nth simulated natural gas mixture;
u($x_{in}$) is an analytical uncertainty of the ith component in the standard gas mixture under the jth concentration; and
u($x_i$) is an uncertainty of the component of the ith elementary substance.

Step S57, high-level calorific values ($H_{s,mn}$) and uncertainties [u($H_{s,mn}$)] of each group of measured components are calculated according to measured mole fractions ($x_{mij}$).

Step S58, an average measurement error [δ($H_s$)] of the high-level calorific values of the simulated natural gas mixtures and a standard uncertainty [u($H_s$)] of the high-level calorific values of the simulated natural gas mixtures are calculated, and expressions thereof are as following:

$$\begin{cases} \delta(H_{s,n}) = H_{s,tn} - H_{s,mn} \\ \delta(H_s) = \sum_{n=1}^{10000} \delta(H_{s,n})/10000 \\ u(H_s) = \sqrt{\left\{\sum_{n=1}^{10000} [u(H_{s,mn})]^2 + \sum_{n=1}^{10000} [\delta(H_{s,n}) - \delta(H_s)]^2\right\}/10000} \end{cases} \quad \text{(Formula 6)}$$

where $H_{s,tn}$ is a high-level calorific value of the nth group of simulated natural gas mixture;
$H_{s,mn}$ is a high-level calorific value of a measured component of the nth group of simulated natural gas mixture;
δ($H_{s,n}$) is a measurement error of the high-level calorific value of the nth group of simulated natural gas mixture;
δ($H_s$) is an average measurement error of the high-level calorific values of the simulated natural gas mixtures;
u($H_{s,mn}$) is an analytical uncertainty of the high-level calorific value of the nth group of simulated natural gas mixture; and
u($H_s$) is a standard uncertainty of the high-level calorific values of the simulated natural gas mixtures.

Step S6, determining whether an evaluation result from the natural gas analysis system to be evaluated is qualified, and providing an conclusion that evaluates the performance of the natural gas analysis system, in which a following step is specifically included.

Step S61, if each component and its high-level calorific value satisfy a calculation formula below at the same time, the evaluation result from the natural gas analysis system to be evaluated is qualified.

For the component of the ith elementary substance:

$$\begin{cases} \delta(x_i) + 2u(x_i) \leq MPE(x_i) \\ \delta(x_i) \leq MPB(x_i) \end{cases} \quad \text{(Formula 7)}$$

where δ($x_i$) is an measurement error of the component of the ith elementary substance;
u(x) is an uncertainty of the component of the ith elementary substance;
MPE($x_i$) is a maximum allowable error of the component of the ith elementary substance; and
MPB($x_i$) is a maximum allowable deviation of the component of the ith elementary substance.

For the high-level calorific value:

$$\begin{cases} \delta(H_s) + 2u(H_s) \leq MPE(H_s) \\ \delta(H_s) \leq MPB(H_s) \end{cases} \quad \text{(Formula 8)}$$

where δ($H_s$) is an average measurement error of the high-level calorific values of the natural gas mixture;
u($H_s$) is the standard uncertainty of the high-level calorific values of the natural gas mixture;
MPE($H_s$) is the maximum allowable error of the high-level calorific values; and
MPB($H_s$) is the maximum allowable deviation of the high-level calorific values.

While the present disclosure has been described in detail above through general description and specific embodiments, some modifications or improvements can be made on the basis of the present disclosure, which will be apparent to those skilled in the art. Therefore, these modifications or improvements made without departing from the spirit of the present disclosure fall within the scope of the claimed protection of the present disclosure.

Apparently, the above-mentioned embodiments are only examples for clear description, and are not intended to limit the implementation manner. For those of ordinary skill in the art, changes or modifications in other different forms can also be made on the basis of the above description. There is no need and cannot be exhaustive of all implementations here. And the obvious changes or changes derived from this are still within the protection scope of the present disclosure.

Finally, it should be noted that the above embodiments are intent to provide illustration only for the technical solutions of the present disclosure, instead of limitation thereto. Although the present disclosure has been described in detail with reference to the above embodiments, it should be understand by those of ordinary skill in the art that modifications still can be made to the technical solutions described in the various foregoing embodiments, or equivalent replacements can still be made to some technical features thereof; and that the essence of the technical solutions related to these modifications or replacements do not deviate from the spirit and scope of the technical solutions of the embodiments of the present disclosure.

What is claimed is:

1. A method for evaluating performance of a natural gas analysis system, comprising:
   obtaining components of the natural gas analysis system as well as a maximum allowable error and a maximum allowable deviation of a calorific value of each of the components, wherein the components refer to a category and a content of a certain elementary substance in the natural gas analysis system;
   determining, according to the components of the natural gas analysis system, components and uncertainties of groups of standard gas mixture by using a principle of uniform distribution, wherein the uncertainties are related to the natural gas analysis system;
   performing, by the natural gas analysis system to be evaluated, 10 times component analysis in turn on the components of each group of standard gas mixture, and recording original data regarding peak areas; performing drift correction on the original data regarding peak areas to obtain drift-corrected peak areas; performing gross error elimination on the drift-corrected peak areas and obtaining final peak areas of respective components of each group of standard gas mixture;
   performing regression analysis between the components of the standard gas mixture and the final peak areas subjected to the drift correction by using a generalized least squares method to obtain calibration functions of the natural gas analysis system and analytical functions of the respective components of the standard gas mixture;
   calculating, by using the calibration functions of the natural gas analysis system, a peak area related to each of components in 10,000 groups of natural gas mixtures, then calculating, by using the analytical functions, a component related to each peak area, and calculating and obtaining an uncertainty and a calorific value uncertainty of each of the components of natural gas mixtures; and
   judging whether an evaluation result from the natural gas analysis system to be evaluated is qualified, and providing a performance evaluation conclusion for the natural gas analysis system.

2. The method for evaluating performance of a natural gas analysis system according to claim 1, wherein determining components and uncertainties of groups of standard gas mixture comprises steps of:
   determining categories of the standard gas mixture according to categories of elementary substances of the natural gas analysis system, wherein the categories of the standard gas mixture should be identical with the categories of elementary substances of the natural gas analysis system;
   determining a quantity of groups of standard gas mixtures that are required according to an order of an analytical function regarding category of each elementary substance;
   determining a quantity of groups of standard gas mixtures according to an order of an analytical function obtained from a last performance evaluation on the natural gas analysis system; and
   determining uncertainty of each component of the standard gas mixture according to uncertainty of the natural gas analysis system.

3. The method for evaluating performance of a natural gas analysis system according to claim 2, wherein obtaining final peak areas of respective components of each group of standard gas mixture comprises steps of:
   performing, by the natural gas analysis system to be evaluated, 10 times component analysis in turn on the components of each group of standard gas mixture, and recording atmospheric pressures and original data regarding peak areas;
   subjecting the original data regarding peak areas to drift correction to obtain drift-corrected peak areas; and
   subjecting the drift-corrected peak areas to gross error elimination to obtain final peak areas of the respective components of each group of standard gas mixture.

4. The method for evaluating performance of a natural gas analysis system according to claim 3, wherein to obtain calibration functions of the natural gas analysis system and analytical functions of the respective components of the standard gas mixture comprises steps of:
   calculating an average peak area and a standard deviation of each component according to an uncertainty and a final peak area of each component in the standard gas mixture;
   calculating, respectively with respect to first-order, second-order, and third-order polynomials, a regression coefficient and goodness-of-fit of a calibration function of each component by using the generalized least squares method for regression processing according to data regarding peak area and component of each component in the standard gas mixture; and
   determining a final calibration function of each component according to the first-order, second-order, and third-order calibration functions of each component, wherein one with goodness-of-fit close to 1 is taken as the optimum, but in a case that there are identical goodness-of-fits, the one with the lower order is better;
   calculating, respectively with respect to first-order, second-order and third-order polynomials, a regression coefficient and goodness-of-fit of an analytical function of each component by using the generalized least squares method for regression processing according to data regarding content and peak area of each component; and
   determining a final analytical function of each component according to the first-order, second-order, and third-order analytical functions of each component, wherein one with goodness-of-fit close to 1 is taken as the optimum, but in the case that there are identical goodness-of-fits, the one with the lower order is better.

5. The method for evaluating performance of a natural gas analysis system according to claim 4, wherein calculating and obtaining an uncertainty and a calorific value uncertainty of each of the components comprises steps of:
   a method for constructing a Monte Carlo model to simulate 10,000 groups of natural gas mixtures, in which the components of each group of natural gas mixture should be within an analysis range of the natural gas analysis system to be evaluated, composition of the 10,000 groups of natural gas mixtures are calculated and obtained by using a subtraction method on the basis of identical intervals and by using methane as balance gas, and unnatural natural gas components should be avoided;

calculating high-level calorific values of the 10,000 groups of simulated natural gas mixtures, respectively, according to the components of the 10,000 groups of simulated natural gas mixtures;

calculating a peak area related to each component of each group of simulated natural gas mixture by using the calibration function;

calculating a measured component related to a resulted peak area of each component of each group of simulated natural gas mixture by using the analytical function;

calculating an analytical uncertainty of each component of each group of simulated natural gas mixture;

calculating an average measurement error and an uncertainty of each component in the simulated natural gas mixture;

calculating high-level calorific values of each group of measured components and uncertainties of each group of measured components according to measured mole fractions; and calculating an average measurement error of the high-level calorific values of the simulated natural gas mixtures and a standard uncertainty of the high-level calorific values of the simulated natural gas mixtures.

6. A device for evaluating performance of a natural gas analysis system, comprising:

a first processing unit configured to obtain components of the natural gas analysis system as well as a maximum allowable error and a maximum allowable deviation of a calorific value of each of the components;

a second processing unit configured to determine components and uncertainties of a standard gas mixture according to the components of the natural gas analysis system and using a principle of uniform distribution;

a third processing unit configured to perform, by the natural gas analysis system to be evaluated, 10 times component analysis in turn on the components of each group of standard gas mixture, and record original data regarding peak areas; perform drift correction on the original data regarding peak areas to obtain drift-corrected peak areas; perform gross error elimination on the drift-corrected peak areas to obtain final peak areas of respective components of each group of standard gas mixture;

a fourth processing unit configured to perform regression analysis between the components of the standard gas mixture and the final peak areas subjected to the drift correction by using a generalized least squares method to obtain calibration functions of the natural gas analysis system and analytical functions of the respective components;

a fifth processing unit configured to calculate, by using the calibration functions of the natural gas analysis system, a peak area related to each of components in 10,000 groups of natural gas mixtures, then calculate, by using the analytical functions, a component related to each peak area, and calculate and obtain an uncertainty and a calorific value uncertainty of each of the components; and a sixth processing unit configured to judge whether an evaluation result from the natural gas analysis system to be evaluated is qualified, and provide a performance evaluation conclusion for the natural gas analysis system.

7. A computer-readable storage medium on which a computer program is stored, wherein the computer program, when being executed by a processor, implements the method according to claim 1.

8. A computer device, comprising a memory, a processor and a computer program stored on the memory and executable by the processor, wherein the processor, when running the computer program thereon, executes the method according to claim 1.

* * * * *